United States Patent
Geraci et al.

(10) Patent No.: US 8,941,654 B2
(45) Date of Patent: Jan. 27, 2015

(54) VIRTUAL FLASHLIGHT FOR REAL-TIME SCENE ILLUMINATION AND DISCOVERY

(75) Inventors: James R. Geraci, Tokyo (JP); Arun Mehta, Tokyo (JP); Alexander Chia, Tokyo (JP); Erek Speed, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 274 days.

(21) Appl. No.: 13/094,213

(22) Filed: Apr. 26, 2011

(65) Prior Publication Data

US 2011/0273448 A1    Nov. 10, 2011

(30) Foreign Application Priority Data

May 6, 2010  (JP) ................. 2010-106807

(51) Int. Cl.
*G06T 15/50* (2011.01)
*A63F 13/40* (2014.01)

(52) U.S. Cl.
CPC .............. *G06T 15/50* (2013.01); *A63F 13/10* (2013.01); *G06T 2215/16* (2013.01); *A63F 2300/1012* (2013.01); *A63F 2300/1031* (2013.01); *A63F 2300/301* (2013.01)
USPC ........................................................ 345/426

(58) Field of Classification Search
CPC ............... G02B 27/017; G02B 2027/0187; G02B 2027/014; G02B 27/0093; G06F 3/011; G06F 3/0346; G06F 3/012; G06T 15/15; G06T 2215/16; H04N 13/0475; G05B 2219/32014
USPC ........................................ 345/426; 346/426
See application file for complete search history.

(56) References Cited

U.S. PATENT DOCUMENTS

| | | | |
|---|---|---|---|
| 6,496,190 B1 | 12/2002 | Driemeyer et al. | |
| 6,525,732 B1 * | 2/2003 | Gadh et al. | 345/428 |
| 6,606,092 B2 | 8/2003 | Driemeyer et al. | |
| 7,173,617 B2 | 2/2007 | Driemeyer et al. | |
| 7,221,365 B1 | 5/2007 | Lévesque et al. | |
| 7,548,238 B2 | 6/2009 | Berteig et al. | |
| 2003/0001844 A1 | 1/2003 | Driemeyer et al. | |
| 2003/0222870 A1 | 12/2003 | Driemeyer et al. | |
| 2004/0135744 A1 * | 7/2004 | Bimber et al. | 345/32 |
| 2007/0018980 A1 | 1/2007 | Berteig et al. | |
| 2007/0195522 A1 * | 8/2007 | Matthews et al. | 362/205 |
| 2008/0143720 A1 * | 6/2008 | Elmquist | 345/426 |
| 2008/0150943 A1 | 6/2008 | LeFrancois | |
| 2009/0109282 A1 * | 4/2009 | Schnebly et al. | 348/55 |
| 2010/0079452 A1 | 4/2010 | Zhou et al. | |
| 2010/0082280 A1 | 4/2010 | Schneider | |

FOREIGN PATENT DOCUMENTS

| | | |
|---|---|---|
| WO | 2007/005739 | 1/2007 |
| WO | 2008/154183 | 12/2008 |

* cited by examiner

*Primary Examiner* — Xiao M. Wu
*Assistant Examiner* — Wynton S Jones
(74) *Attorney, Agent, or Firm* — Greenblum & Bernstein, P.L.C.

(57) ABSTRACT

One object of the present invention is to provide a system that adopts a global illumination technique to seamlessly span light across a real world and a virtual world. The first aspect of the present invention is directed to a system for producing three dimensional images. The system includes a magnetic field sensor; a first 6DOF magnetic tracker; a flashlight which has a second 6DOF magnetic tracker; a monitor; an analyzer; and a rendering apparatus.

20 Claims, 4 Drawing Sheets

VIRTUAL FLASHLIGHT FOR REAL-TIME SCENE ILLUMINATION AND DISCOVERY

TECHNICAL FIELD

The present invention relates to a system for producing three dimensional images that comprises seamless light transport between a real world and a virtual world. The present invention further relates to a system for showing different images to various players simultaneously.

BACKGROUND OF THE INVENTION

Going to an explorer type attraction can be a fun activity. However, each passes through the attraction will contain the same items and thus will not provide as fresh of an experience on successive visitors. An attraction's freshness can be maintained by modifying the attraction every so often. However, moving physical objects in the attraction is dangerous, expensive and difficult to do with any great frequency.

A magnetic tracking system (MTSs) for a six-degree-of-freedom (6DOF) is already known in the art. The pamphlet of WO 2008-154183 discloses a system for compensating for large moving objects in magnetic tracking environments. The system comprises 6 DOF sensor to understand the position and direction of a human.

CITATION LIST

Patent Literature

WO 2008-154183

SUMMARY OF INVENTION

Technical Problem

One object of the present invention is to provide a system for maintaining an attraction's freshness and maintaining a high level of immersion quality for the attraction.

Another object of the present invention is to provide a system that adopts a global illumination technique that seamlessly spans across a real world and a virtual world.

Further object of the present invention is to provide a system that can show different images to a plurality of players that watch the same monitor at the same time.

Solution to Problem

The present invention can provide a system for creating an interactive adventure attraction that employs a combination of novel input, rendering and viewing technologies to bring the environment to life by providing a heightened sense of immersion and allowing for content to be dynamically modified at any time for a fresh experience on subsequent visits.

To better maintain an attraction's freshness while at the simultaneously maintaining a high level of immersion quality for the attraction, the present invention provides a system that combines a new rendering technique, input apparatus and display technologies. In particular, the present invention adopts a new GPU based progressive photon mapping, 6DOF magnetic markers and 3D stereographic visualization technique.

The first aspect of the present invention is directed to a system 101 for producing three dimensional images. The system comprises a magnetic field base-station 102; a first 6DOF magnetic tracker 103; a flashlight 104 which has a second 6DOF magnetic tracker 105; a monitor 106; an analyzer 107; and a rendering apparatus 108.

The analyzer 107 receives data from the magnetic field base-station 102 and calculates the position and orientation of the first 6DOF magnetic tracker 103 and the second 6DOF magnetic tracker 105.

The rendering apparatus, a renderer, 108 calculates the image shown by the monitor 106. The renderer 108 computes an image of a virtual light consistent with the light from the flashlight 104 using the position and direction of the second 6DOF magnetic tracker 105. The position and direction of the second 6DOF magnetic tracker 105 corresponds to the position of the flashlight 104 and the direction of the second 6DOF magnetic tracker 105 corresponds to the direction of light emitted from the flashlight 104.

Preferred embodiment of the first aspect of the present invention is that the rendering apparatus 108 calculates the light emitted from the flashlight 104 as emitted photons such that the rendering apparatus 108 can compute the image of the virtual scene illuminated by the virtual light. In other words this system comprises a photon mapping engine so that it can calculate the virtual light in virtual world considering the light form the real world in real time and in high quality. The virtual light may illuminate an object or objects in the virtual world. The necessary data including a light vector are calculated using the sensed information.

Preferred embodiment of the first aspect of the present invention is that the rendering apparatus 108 calculates the light emitted from the flashlight 104 as emitted photons such that the rendering apparatus 108 can compute the image of the virtual world comprising an object illuminated by the light. In this virtual world, a dimmed environment has been prepared to show. The environment comprises various virtual objects that are difficult to see without any light. When light is shed on a virtual object, the object may shine and a player may recognize the shined part. To realize the above, the system calculates the area where the light from the flashlight 104 spreads in the virtual world and illuminates the shined object using the photon mapping technique.

Preferred embodiment of the first aspect of the present invention is that the real light emitted from the flashlight 104 and the virtual light are one seamless model of light.

Preferred embodiment of the first aspect of the present invention is that the system further comprises glasses 110 with optical shutters 131 and a synchronizer 110 that synchronizes the timing of the optical shutters 131 and the timing for displaying the image. The synchronizer 110 controls the timing of the optical shutter 131 and timing of the image shown by the monitor 106. Thus the other player can watch another image shown on the monitor. The synchronizer 110 may also control the timing of the shutter 131 associated with each player's left or right eye with the timing of the image shown on the monitor.

Advantageous Effects of Invention

The present invention can provide a system for maintaining an attraction's freshness maintaining a high level of immersion quality for the attraction.

The present invention can provide a system that adopts a global illumination technique to seamlessly span light across a real world and a virtual world.

The present invention can provide a system that can show different images to a plurality of players that watch the same monitor at the same time.

BRIEF DESCRIPTION OF DRAWINGS

FIG. 2B shows an example of image which is shown on the monitor when the flashlight is turned on. FIG. 2C shows an example of image which is shown on the monitor when two flashlights are turned on.

DESCRIPTION OF EMBODIMENTS

Figure 1:
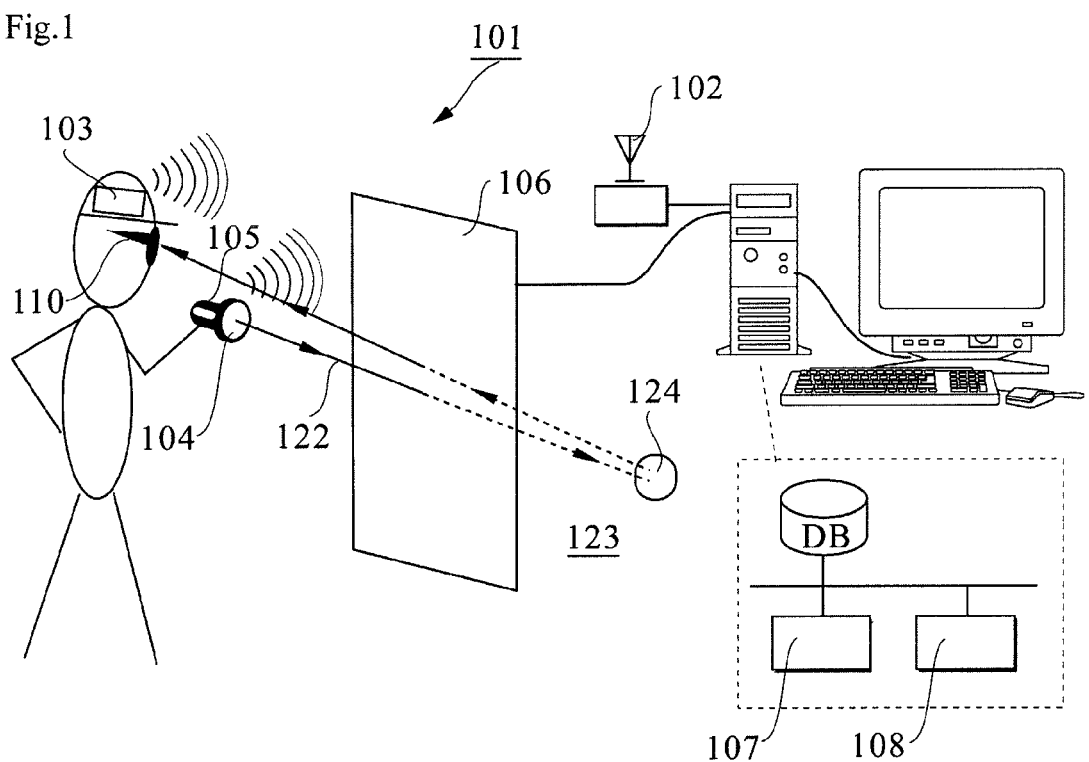
FIG. 1 depicts the block diagram of the present system for providing a new interactive augmented virtual environment.

The present invention contributes a new interactive augmented virtual environment by modelling bidirectional light transport across the real/virtual boundary of a display surface, maintaining a 1:1 scale in size and consistent orientation between the two worlds. The virtual world is rendered in real time on the GPU using progressive photon mapping which gives our image a level of realism not previously obtainable at interactive rates. In the real world, two 6DOF magnetic markers each report their absolute position and orientation to the progressive photon map. One marker represents a directed flashlight whose position and light model are used to illuminate the virtual objects that it interacts with when pointing towards the screen. The other marker reports user's head position which is used to allow peering into the virtual world at different angles as one might peer through a window. Thus, we have successfully extended a global illumination technique to seamlessly span both worlds.

The first aspect of the present invention is directed to a system 101 for producing three dimensional images. As shown in the FIG. 1, the system 101 comprises a magnetic field base-station 102; a first 6DOF magnetic tracker 103; a flashlight 104 which has a second 6DOF magnetic tracker 105; a monitor 106; an analyzer 107; and a rendering apparatus 108. The system may comprise further apparatus. An example of such apparatus is an apparatus used for a game system.

The system 101 may be an attraction in a theme park or a game centre controlled by a computer or computers. Another example of the system is a game system for personal use, like play station (registered trademark). The first 6DOF magnetic tracker 103 may be mounted on the helmet or hat so that the first 6DOF magnetic tracker 103 indicates the position and direction of the player's eye.

The magnetic tracking system (MTS) is already known in the art. The example of MTS is disclosed in the pamphlet of WO 2008-154183. The examples of magnetic field base-station 102, the first 6DOF magnetic tracker 103, the second 6DOF magnetic tracker 105 and an analyzer 107 are already existing apparatus used in the MTS. A skilled person may modify conventional apparatus used in the MTS in applying them to the present invention. The analyzer 107 receives data from the magnetic field sensor 102 and calculates the position and orientation of the first 6DOF magnetic tracker 103 and the second 6DOF magnetic tracker 105.

The flashlight 104 is an electrical flashlight or an electrical torch which has the second 6DOF magnetic tracker 105. The flashlight 104 may have a switch. When the switch is turned on flashlight 104 emits light, a real light. Because of the second 6DOF magnetic tracker 105, the system 101 can recognize the position and a direction of the flashlight 104. In other words, the system 101 can recognize the position of the flashlight and the direction of the real light so that it can calculate the virtual light seamlessly shown on the monitor 106.

The system 101 comprises one or a plurality of monitors. At least one monitor shows an image that considers the virtual light. The virtual light in this document is a continuous light from the flashlight in the virtual light. The monitor or monitors may be put on walls, ceilings, doors and floors, and may be curved surfaces.

The rendering apparatus, a renderer, 108 calculates the image shown by the monitor 106. The renderer 108 computes an image of a virtual light consistent with the light from the flashlight 104 using the position and direction of the second 6DOF magnetic tracker 105. The position of the second 6DOF magnetic tracker 105 corresponds to the position of the flashlight 104 and the direction of the second 6DOF magnetic tracker 105 corresponds to the direction of light emitted from the flashlight 104.

Preferred embodiment of the first aspect of the present invention is that the rendering apparatus 108 calculates the light emitted from the flashlight 104 as emitted photons such that the rendering apparatus 108 can compute the image using the virtual light. In other words this system comprises a photon mapping engine so that it can calculate the virtual light in the virtual world as if it were an extension of the light from the real world in real time and in high quality. The virtual light may illuminate an object or objects in the virtual world. The necessary data including a light vector are calculated using the sensed information.

The photon mapping engine is already known in the art. The pamphlet of WO2007-005739, the specification of U.S. Pat. No. 7,221,365 and the US patent application no. 20100079452 disclose the photon mapping engine. These documents are incorporated herein by reference in its entirety. The view point and the view vector are calculated using the position and the direction of each eye of the player. The position and the direction of each eye of the player may be calculated using the position and the direction of the first 6DOF magnetic tracker 103. The system 101 may use the position and the direction of the first 6DOF magnetic tracker 103 to establish the position and the direction of each eye of the player.

Preferred embodiment of the first aspect of the present invention is that the rendering apparatus 108 calculates the light emitted from the flashlight 104 as emitted photons such that the rendering apparatus 108 can compute the image of the virtual world that comprises an object illuminated by the light. In this virtual world, a dimmed environment has been prepared to show. The environment comprises various virtual objects that are difficult to see without any light. When light is shed on a virtual object, the object may shine and a player may recognize the shined part. To realize the above, the system calculates the area where the light from the flashlight 104 spreads in the virtual world and renders the image of the illuminated scene using the photon mapping technique.

Preferred embodiment of the first aspect of the present invention is that the light emitted from the flashlight 104 and the virtual light are one seamless model of light.

Figure 2A:
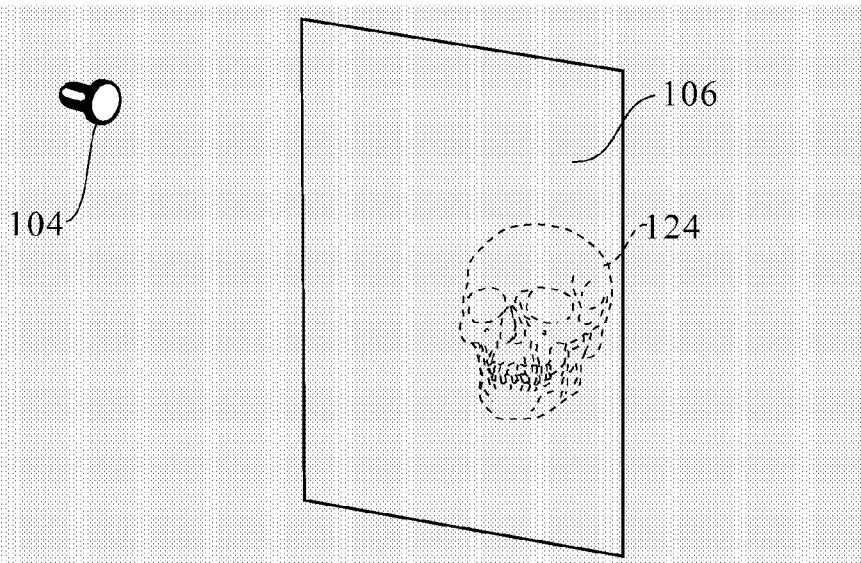
FIG. 2A shows an example of image which is shown on the monitor when the flashlight is turned off.
Figure 2B:
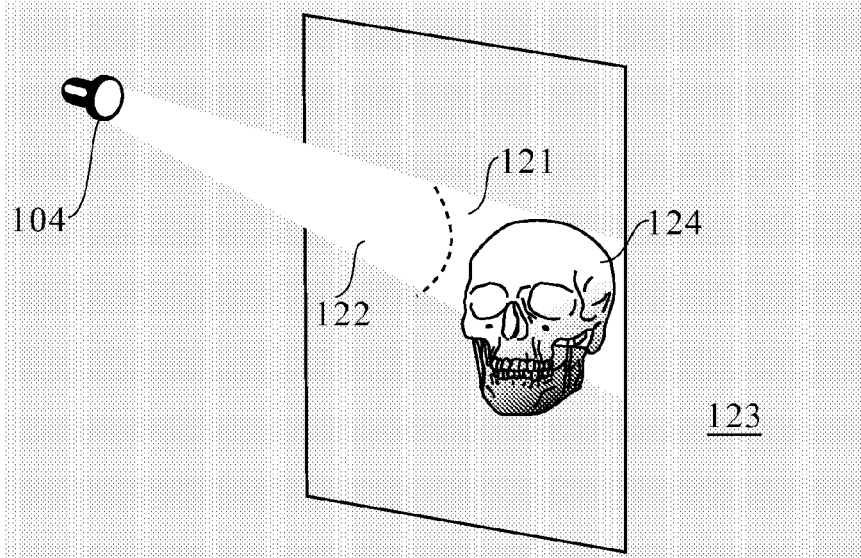
Figure 2C:
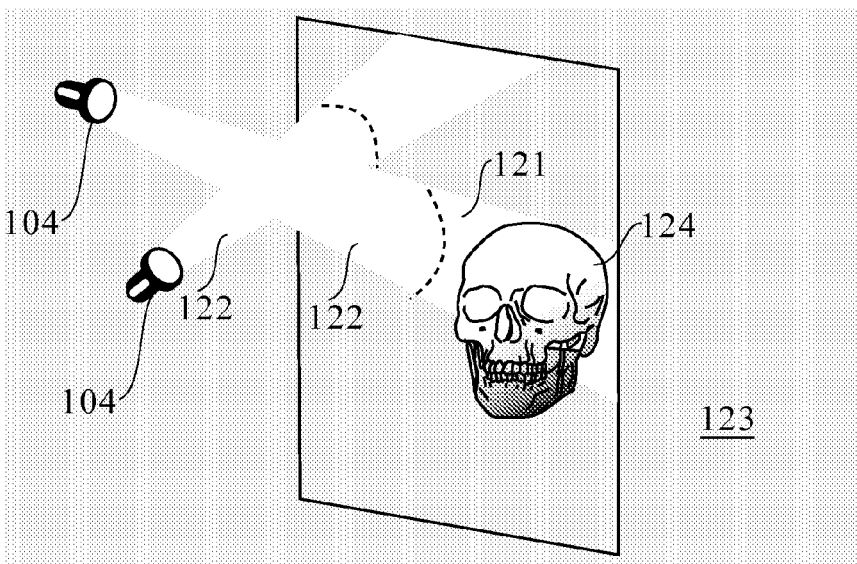

FIG. 2A shows an example of image which is shown on the monitor when the flashlight is turned off. FIG. 2B shows an example of image which is shown on the monitor when the flashlight is turned on. FIG. 2C shows an example of image which is shown on the monitor when two flashlights are turned on. As shown in the FIG. 2A, when the flashlight is tuned off, the monitor 106 shows only the dimmed environment. The virtual object 124 is difficult to see. When one player turns his flashlight 104 on and illuminates the monitor 106 using his flashlight 104, the system calculates the virtual light 121 which is seamlessly connected with the real light 122 emitted from the flashlight 104. The virtual light 121 is applied within the scene displayed by the monitor 106 as if the real light 121 were illuminating the virtual world 123 as shown in the FIG. 2B. When the virtual light leads to a virtual object 124 in the virtual world 123, the system 101 calculates how to illuminate the virtual object 124 using the photon mapping engine. Furthermore, when two or more players illuminate one virtual world, the system 101 calculates how to apply the virtual lights and how to illuminate virtual objects 124 using the photon mapping engine as shown in FIG. 2 C.

To realize the photon mapping, the photon mapping engine may comprise a database for photon mapping which stores required information to realize the photon mapping. The database may comprise the data of the average number of photons for each flashlight. The system may comprise a database storing the environment images of the virtual world, the images of the virtual objects and the positions of the virtual objects.

The method for distributing photons starts where a renderer controller (or equivalent functional element) in a rendering application determines the photon emission from each of the flashlights in the scene during photon mapping. Typically, the photon emission rate emitted per flashlight is a value designated by a player of the rendering application. For example, the photon emission rate may be a number the player inputs directly into the rendering application when rendering an image of the scene. If the player does not supply a photon emission rate for a flashlight, a default value may be used instead. The product of the number of flashlights in the scene and the photon emission rate per flashlight represents the total photon emission rate used in the photon mapping algorithm during rendering (i.e., a "budget" of photons per second for photon mapping).

The renderer controller determines the actual energy emitted per second for each of the flashlights in the scene. The player may select define various parameters for any particular flashlight, such as the intensity and color of the flashlight. In one embodiment, the renderer controller determines the actual energy of a flashlight from these lighting parameters. In alternative embodiments, the renderer controller may determine the energy of a flashlight from a combination of one or more of these parameters with other lighting parameters or from all other lighting parameters together.

Next, the total energy emitted per second for the scene is computed. In one embodiment, the renderer controller sums together the actual rate of energy emission of each of the flashlights in the scene to compute the total rate of energy emission for the scene. However, in alternative embodiments, other ways of computing the total energy emission rate may be used.

In calculating the average energy of the flashlight in the scene, the average energy of the flashlights in the scene is computed. In one embodiment, the renderer controller divides the total energy for the scene by the number of flashlights in the scene to compute the average energy of the flashlights. However, in alternative embodiments, other ways of computing the average energy may be used.

In comparing the actual energy to the average energy of the flashlight, for each of the flashlights in the scene, the renderer controller compares the actual energy of the flashlight to the average energy of the flashlight. In one embodiment, this comparison step entails computing the ratio of the actual energy of the flashlight to the average energy of the flashlight.

Finally, in distributing photons based on the comparison, the renderer controller distributes photons to each of the flashlights in the scene based on the comparison. In one embodiment, to each of the flashlights, the renderer controller distributes a number of photons equal to the product of the average number of photons per flashlight and the ratio of the actual energy of the flashlight to the average energy of the flashlight.

In alternative embodiments, the above steps may be modified to allow for other comparison and distribution techniques. For example, in one alternative embodiment, the comparison may entail computing, for each of the flashlights in the scene, a ratio of the actual energy of the flashlight to the total energy for the scene. Then, in the distributing step, photons may be distributed to each of the different flashlights in the scene based on the product of the total number of photons available for photon mapping (i.e., the photon "budget") and the ratio.

As is apparent from the foregoing, the method systematically distributes more photons to higher-energy flashlights in the scene. The only task left to the user is to choose the overall number of photons (or photon "budget") to use for photon mapping. Such a distribution is advantageous because, as a general matter, the effects of indirect lighting from a higher-energy flashlight on image quality far outweigh the effects of indirect lighting from a lower-energy flashlight. By distributing proportionally more photons to higher-energy flashlights within the scene, more processing time will be spent on the indirect lighting effects from the higher-energy flashlights, thereby substantially improving image quality against overall processing time.

Preferred embodiment of the first aspect of the present invention is that the system further comprises glasses 110 with optical shutters 131 and a synchronizer 110 that synchronizes the timing of the optical shutters 131 and the timing for displaying the image. The synchronizer 110 controls the timing of the optical shutter 131 and timing of the image shown by the monitor 106. Thus the other player can watch a different image shown on the monitor 106. The synchronizer 110 may also control the timing of the optical shutter 131 associated with each player's left or right eye with the timing of the image shown on the monitor 106.

Figure 3A:
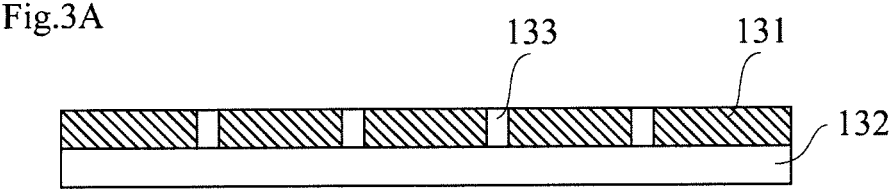
FIG. 3A shows a side cross-section view of the optical shutter on the glasses when the apertures are opened.
Figure 3B:
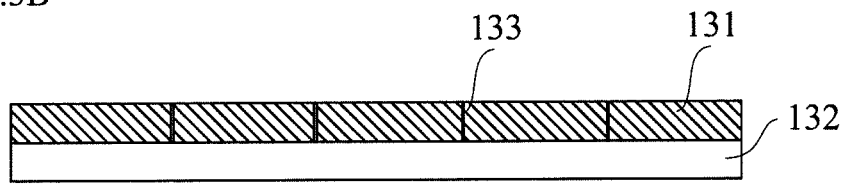
FIG. 3B shows the side cross-section view of the optical shutter on the glasses when the apertures are closed.

The player may wear the glasses 110. The glasses 110 have optical shutters 131. The example of the optical shutter 131 is piezoelectric light shutter. FIG. 3A shows a side cross-section view of an optical shutter 131 on the glasses 110 when the apertures are opened. The optical shutter 131 is mounted on the lens 132 of the glasses 110. The optical shutters 131 are laterally moveable in their respective planes so as to selectively open and close apertures 133. FIG. 3B shows the side cross-section view of the optical shutter on the glasses when the apertures are closed.

Figure 4:
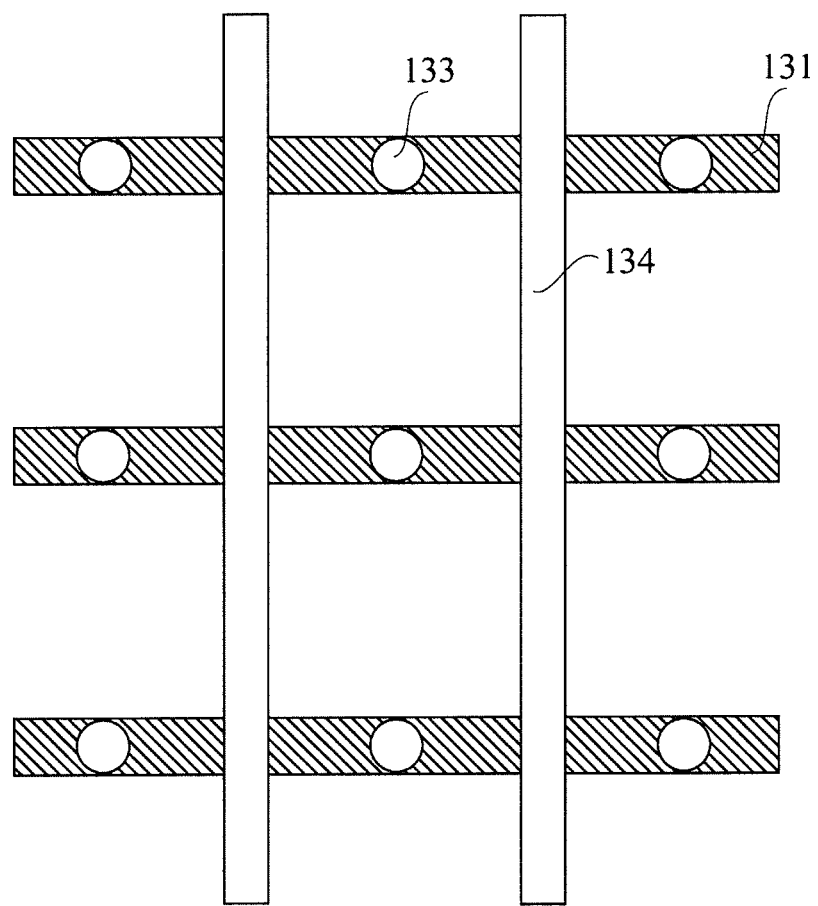
FIG. 4 shows an example of the top view of the optical shutter.

FIG. 4 shows an example of the top view of the optical shutter 131. As shown in FIG. 4, the optical shutter 131 has transparent electrodes 134 that actuate the piezoelectric light shutter. The synchronizer 110 controls the timing for opening or closing the apertures 133. When an aperture 133 is controlled to be closed, the light emitted from the monitor 106 does not reach the player's eye.

The system 101 controls the timing of showing images for the player by the monitor 106 and the timing of opening the apertures 133 of the glasses 110 so that the other player can watch another image shown on the monitor 106. The system 101, for example, separates 1 second into 60 fields. The duration of each field is ¹⁄₆₀ second. The system 101 further divides each field into segments for each player.

Figure 5:
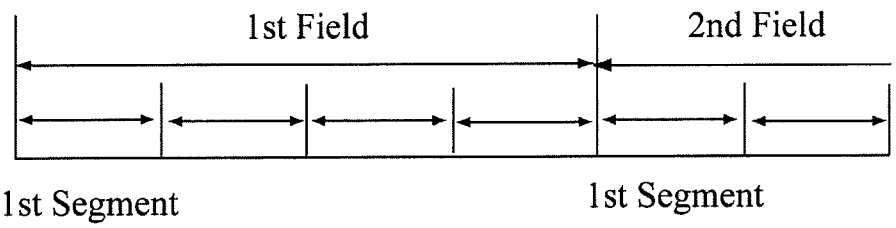
FIG. 5 shows the concept of the field and segment.

FIG. 5 shows the concept of the field and segment. As shown in FIG. 5, each field has several segments. The first segment of each field is the segment for a player A. The subsequent segment of each field is the segment for another player.

Figure 6:
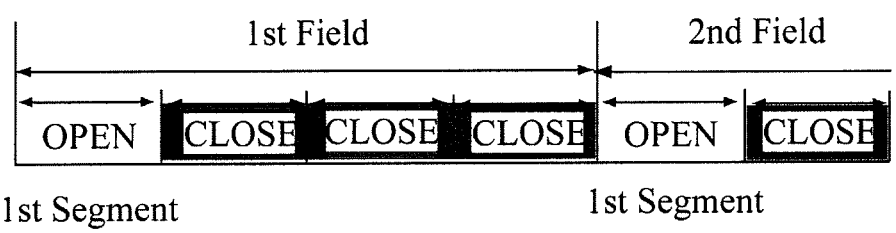
FIG. 6 shows the timing of the optical shutter.

FIG. 6 shows the timing of the optical shutter 131. Similar to the FIG. 5, the first segment is allotted for the player A. Thus the apertures 133 of the glasses 100, which the player A wears, open at the first segment of each field. Other players who selected the same topic or the same game as selected by the player A may see the same image as the image that is seen by the player A. The timing of the image shown on the monitor 106 and the timing of the optical shutter 131 are controlled using the synchronizer 110.

Another embodiment of the present invention is that two or more players can watch a separate image on the same display. The example of the sequence of rendered images is left-eye (player 1), left-eye (player 2), . . . , left-eye (player n), right-eye (player 1), right-eye (player 2), . . . , right-eye (player n) and the sequence may be repeated. In other words, this embodiment further divides the field into double segments such that separate images are shown for each individual players, as well as for each individual player's left or right eye.

Another embodiment of the present invention is that the glasses 110 have a receiver and can show computer graphics through each lens. The images shown through the lens are computed by the system 101. The system 101 may modify the images easily.

Figure 7:
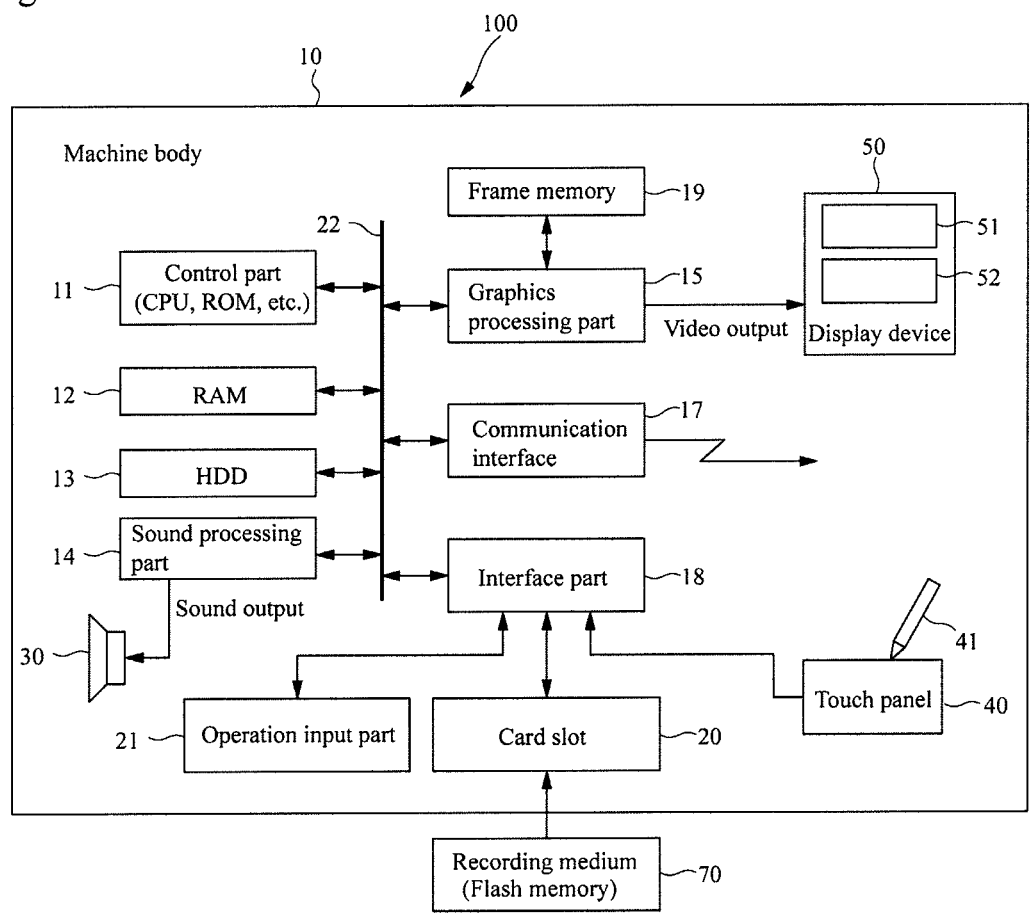
FIG. 7 shows a block diagram of a computer.

FIG. 7 is a block diagram for illustrating a configuration example of a computer shown in FIG. 1 according to one embodiment of the present invention.

The operation input part 21 is composed of power switches such as a power switch and keys such as a cross key.

The circuit placed within the machine body 10 comprises a control part 11, a RAM 12, a hard disc drive (HDD) 13, a sound processing part 14, a graphics processing part 15, a communication interface 17, an interface part 18, a frame memory 19, and a card slot 20. The control part 11, the RAM 12, the hard disc drive (HDD) 13, the sound processing part 14, the graphics processing part 15, the communication interface 17, and the interface part 18 are each connected to an internal bus 22.

The control part 11, comprising a CPU, a ROM, etc., controls the entire game machine 100 in accordance with the control program stored in the HDD 13 or a recording medium 70. The control device 11 is provided with an internal timer which is used, for example, to generate timer interrupts. The RAM 12 is also used as a working area for the control part 11.

The sound processing part 14, provided with a sound input/output interface function for performing D/A and A/D conversion of sound signals, is connected to a sound output device 30 composed, for example, of a speaker. The sound processing part 14 outputs sound signals to the sound output device 30 in accordance with the sound output instructions from the control part 11 executing processes in accordance with various control programs.

The graphics processing part 15 is connected to the display device 50 has the first image display part 51 and the second image display part 52. The graphics processing part 15 distributes images to the frame memory 19 in accordance with the drawing instructions from the control part 11 and also outputs video signals for displaying the images on the image display parts 51 and 52 to the display device 50. The switching time for the images displayed according to the video signals is set to 1/30 seconds per frame, for example.

The recording medium 70 stored with programs etc. is inserted into the card slot 20. The recording medium 70 in the present embodiment is a semiconductor memory such as a writable flash memory. The communication interface 17 is connectable to another game machine 100 wired or wirelessly, and also is connectable to a communication network such as the Internet. The machine body 10 can communicate with another game machine 100 using the communication function of the communication interface 17.

The operation input part 21, the card slot 20 and the touch panel 40 are connected to the interface part 18. The interface part 18 stores, on the RAM 12, the instruction data from the operation input part 21 based on the player's (user's) operation and the instruction data based on the player's operation of the touch panel 40 using a touch pen 41 etc. Then, the control unit 11 executes various arithmetic processing in accordance with the instruction data stored in the RAM 12.

The touch panel 40 is stacked on the side of the display screen(s) of both or either of the image display parts 51 and 52. Therefore, the control part 11 recognizes input information depending on the operation inputs by a player, by managing/controlling the timing of display at the side of both or either of the image display parts 51 and 52 where the touch panel 40 is stacked, the timing of operation of the touch panel 40 using the touch pen 41 etc. and the position coordinate. The display device 50 may configure the display screen with one image display part instead of having a plurality of image display parts such as the image display parts 51 and 52.

The interface part 18 executes the processes, in accordance with the instructions from the control part 11, such as storing the data showing the progress of the game stored in the RAM 12 in the recording medium 70 which is inserted into the card slot 20, or reading out the game data at the time of interruption stored in the recording medium 70 and transferring the data to the RAM 12.

Various data such as a control program for playing a game on the game machine 100 is stored in the recording medium 70. The various data such as a control program stored in the recording medium 70 is read out by the control part 11 through the card slot 20 where the recording medium 70 is inserted and is loaded into the RAM 12.

The control part 11 executes various processes, in accordance with the control program loaded into the RAM 12, such as outputting drawing instructions to the graphics processing part 15, or outputting sound output instructions to the sound processing part 14. While the control part 11 is executing the processing, the data occurring intermediately depending on the game progress is stored in the RAM 12 used as a working memory.

EXAMPLE 1

Archaeology Adventure

The world's greatest archaeological finds are generally a combination of artefacts and environment, such as: the sarcophagus of Egyptian Pharaoh Ramses I, buried in Tomb KV16 in the Valley of the Kings; the excavated pottery, tools, plaster casts and ruins comprising the Roman town of Pompeii, still frozen in time at the moment it was buried by volcanic ash in 79 AD. Unfortunately, these historic and inspiring windows into the past are not easily transported around the world, and in general the environments themselves cannot be moved at all, except in subdued photographic or video format. An example application of the present invention is a darkened exhibition space in a museum where visitors are equipped with a hard-hat, flashlight, and stereoscopic glasses at the entrance.

As individuals traverse through the space, multiple screens attached to the walls, ceiling, floor, or other fixed physical structures become seamless windows to a high quality rendering of distant pasts across the Earth. These preserved moments in time are illuminated by a mix of low ambient light shared in both realities and by a flashlight directing real photons into the real spaces and virtual photons into the virtual spaces. One high quality scan of the geometry and textures of artefacts and environment from an archaeological site can be shared among an unlimited number of exhibition sites around the world, and thematically changed at no cost from week to week, hour to hour, or at each individual's discretion, providing incremental value to both visitor and exhibitor.

The present invention explores new illumination techniques and original applications in a mixed reality environment where real and virtual worlds are seamlessly connected via displays representing the boundary surfaces. Wireless magnetic trackers measure absolute position and orientation of a user's head and a hand held flashlight in real time, completing a universal physical description of the merged realities with enough accuracy to shine virtual particles through the screen and employ the advanced rendering technique of photon mapping to illuminate virtual scenes at interactive rates. Stereographic rendering of the scene at the boundary surface may complete the integration between the real and virtual worlds from the user's perspective, delivering a powerful visual and interactive experience well suited for applications in education and entertainment.

This example provides a memorable and interactive experience for connecting people with the ancient worlds through an augmented virtual environment and utilizing photon mapping to render virtual scenes at real time rates while maintaining quality. This example highlights one specific application of the present invention, exploring an archaeological site. It is clear that a similar technology setup could enable many creative new experiences, such as an interactive planetarium, exploring layers or structure in the human body, and a mixed reality haunted house attraction.

INDUSTRIAL APPLICABILITY

The present system may be used in the entertainment industry and educational industry.

The invention claimed is:

1. A system for producing three dimensional images, the system comprises:
   a magnetic field base-station;
   a first 6DOF magnetic tracker for measuring a magnetic field generated by the magnetic field base-station and wirelessly communicating with the magnetic field base-station, the first 6DOF magnetic tracker mounted on a player's head and configured to track the player's head in a real world space;
   a flashlight which has a second 6DOF magnetic tracker and which emits real photons in the real world space, the second 6DOF magnetic tracker being capable of measuring a magnetic field generated by the magnetic field base-station and wirelessly communicating with the magnetic field base-station, the second 6DOF magnetic tracker configured to track the flashlight in the real world space;
   a monitor for showing an image;
   an analyzer that receives data from the magnetic field base-station, wherein the analyzer is configured to calculate a position and an orientation of the first 6DOF magnetic tracker and the second 6DOF magnetic tracker for tracking the player's head and the flashlight in the real world space;
   a rendering apparatus for calculating the image and projecting a virtual light comprising virtual photons in the image, the virtual photons being projected consistent with the real photons emitted from the flashlight in the real world space and based on the position and orientation of the second 6DOF magnetic tracker in the real world space, the image being calculated consistent with a viewpoint of the player's head that is calculated based on the position and the orientation of the first 6DOF magnetic tracker in the real world space.

2. The system in accordance with claim 1, wherein the rendering apparatus calculates the light emitted from the flashlight as the real photons such that the rendering apparatus can compute the image using the virtual light.

3. The system in accordance with claim 1, wherein the rendering apparatus calculates the light emitted from the flashlight as the real photons such that the rendering apparatus can compute the image of a virtual world comprising objects illuminated by the light.

4. The system in accordance with claim 1, wherein the light emitted from the flashlight and the virtual light are seamless.

5. The system in accordance with claim 1, further comprising:
   glasses mounted on the player's head, the glasses having optical shutters; and
   a synchronizer that synchronizes a timing of the optical shutters and a timing for showing the image.

6. The system in accordance with claim 1, further comprising:
   glasses mounted on the player's head, the glasses having optical shutters; and
   a synchronizer that synchronizes a timing of the optical shutters with a timing for showing the image such that other players can watch other images displayed by the monitor.

7. The system in accordance with claim 1, wherein the rendering apparatus calculates a boundary between the real photons and the virtual light on the monitor such that the virtual light is consistent with the real photons emitted from the flashlight in the real world space.

8. The system in accordance with claim 1, wherein the rendering apparatus determines a photon emission rate of the flashlight, by which the flashlight emits the real photons, and uses the photon emission rate of the flashlight in a photon mapping algorithm when projecting the virtual light comprising the virtual photons in the image.

9. The system in accordance with claim 1, wherein the rendering apparatus determines at least one selectable parameter of the flashlight, and uses the selectable parameter when projecting the virtual light comprising the virtual photons in the image.

10. The system in accordance with claim 1, further comprising:
    a plurality of flashlights which each emit the real photons in the real world space,
    wherein the rendering apparatus determines a rate of energy emission of the plurality of flashlights, and uses the rate of energy emission of the plurality of flashlights when projecting the virtual light comprising the virtual photons in the image.

11. The system in accordance with claim 10, wherein the rendering apparatus sums an actual rate of energy emission of each of the plurality of flashlights when determining the rate of energy emission, the rate of energy emission comprising a total energy of the plurality of flashlights.

12. The system in accordance with claim 10, wherein the rendering apparatus computes an average rate of energy emission of the plurality of flashlights when determining the rate of energy emission, the rate of energy emission comprising an average energy of the plurality of flashlights.

13. A display system for producing virtual images, the display system comprising:
 a receiver that receives a first signal corresponding to a player in a real word space, and receives a second signal corresponding to a position of a flashlight in the real world space;
 a processor that calculates a viewpoint and a view vector of the player in the real world space based on the first signal, and calculates a position and a direction of the flashlight in the real world space;
 a monitor that displays a virtual image calculated by the processor,
 wherein the processor calculates the virtual image based on the viewpoint and the view vector of the player in the real world space,
 the processor calculates an area where a light from the flashlight in the real world space spreads in the virtual image based on the position and the direction of the flashlight in the real world space, and
 the processor calculates a virtual light in the image that illuminates the area in the virtual image as an extension of the light from the flashlight in the real world space to seamlessly span the light from the flashlight in the real world space into the virtual image.

14. The display system in accordance with claim 13, wherein the processor calculates a boundary between the light from the flashlight in the real world and the area in the virtual image such that the area is consistent with the light emitted from the flashlight in the real world.

15. The display system in accordance with claim 13, wherein the processor determines a photon emission rate of the flashlight, by which the flashlight emits the light in the real world space, and uses the photon emission rate of the flashlight in a photon mapping algorithm to calculate the virtual light in the image.

16. The display system in accordance with claim 13, wherein the processor determines at least one selectable parameter of the flashlight, and uses the selectable parameter when calculating the virtual light in the image.

17. The display system in accordance with claim 13, wherein
 the processor detects a plurality of flashlights which each emit the light in the real world space, and
 the processor determines a rate of energy emission of the plurality of flashlights, and uses the rate of energy emission of the plurality of flashlights when calculating the virtual light in the image.

18. The display system in accordance with claim 17, wherein the processor sums an actual rate of energy emission of each of the plurality of flashlights when determining the rate of energy emission, the rate of energy emission comprising a total energy of the plurality of flashlights.

19. The display system in accordance with claim 17, wherein the processor computes an average rate of energy emission of the plurality of flashlights when determining the rate of energy emission, the rate of energy emission comprising an average energy of the plurality of flashlights.

20. A non-transitory computer-readable medium including an executable program that, when executed by a processor, causes the processor to perform operations comprising:
 receiving a first signal corresponding to a player in a real word space;
 receiving a second signal corresponding to a position of a flashlight in the real world space;
 calculating a viewpoint and a view vector of the player in the real world space based on the first signal;
 calculating a position and a direction of the flashlight in the real world space;
 calculating a virtual image based on the viewpoint and the view vector of the player in the real world space;
 calculating an area where a light from the flashlight in the real world space spreads in the virtual image based on the position and the direction of the flashlight in the real world space;
 calculating a virtual light in the image that illuminates the area in the virtual image as an extension of the light from the flashlight in the real world space to seamlessly span the light from the flashlight in the real world space into the virtual image; and
 displaying the virtual image including the virtual light on a monitor.

* * * * *